July 21, 1964 W. C. JONES 3,141,610
PULMONARY FUNCTION ANALYZING DEVICE
Filed March 22, 1961
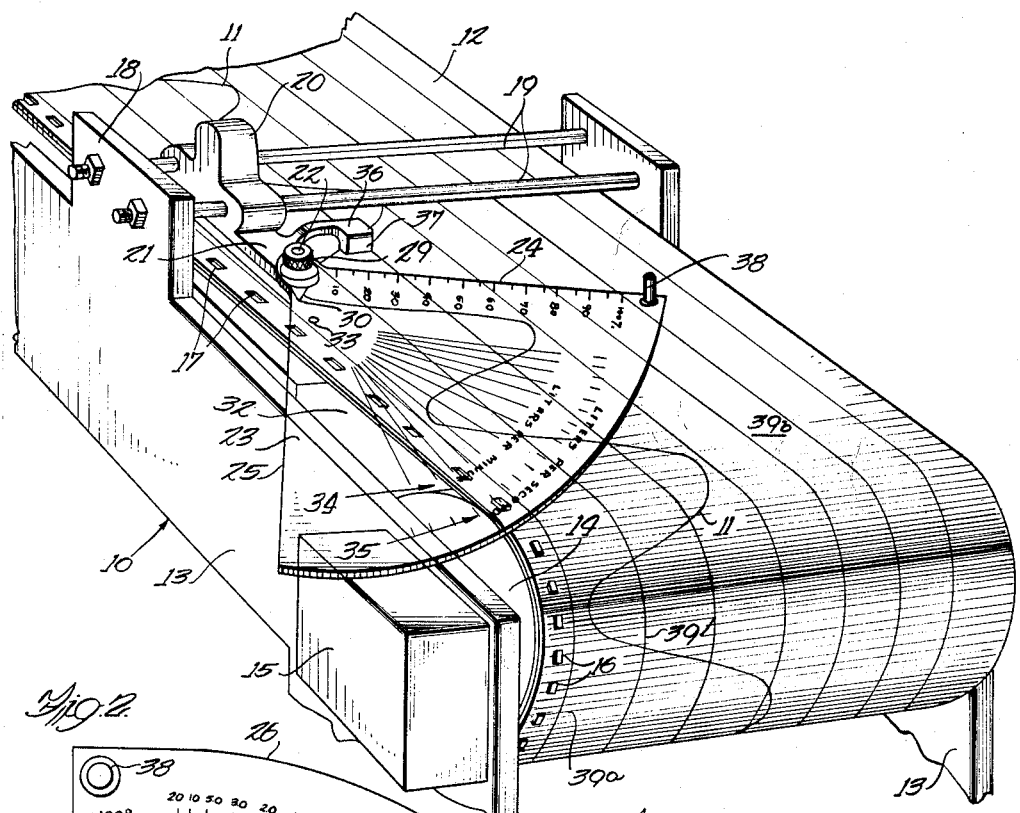
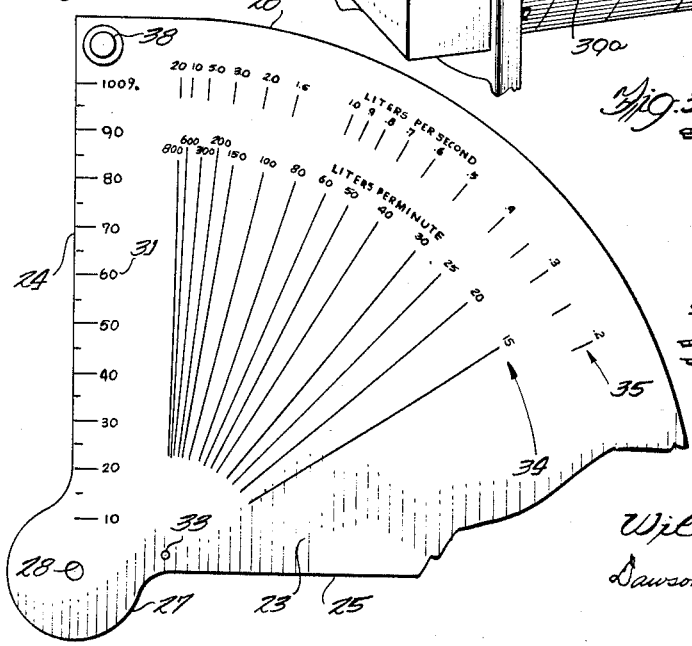
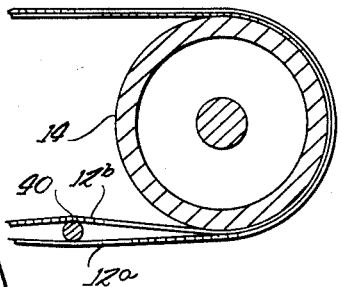
Inventor
William C. Jones
Dawson, Tilton, Fallon & Lungmus
Attorneys

United States Patent Office 3,141,610
Patented July 21, 1964

3,141,610
PULMONARY FUNCTION ANALYZING DEVICE
William C. Jones, 16 W. 328 Walnut Lane, Timber Trails, Elmhurst, Ill.
Filed Mar. 22, 1961, Ser. No. 97,508
3 Claims. (Cl. 235—61)

This invention relates to pulmonary function analysis and, more specifically, to a device particularly useful in rapidly analyzing pulmonary function graphs.

An object of the present invention is to provide a device which may be easily manipulated in analyzing a graph formed by a pulmonary function testing apparatus and to determine the air flow rates and percentages of maximum vital capacity for any given subject. Another object is to provide a device which may be used for quickly analyzing the volume characteristics of a subject's breathing pattern without interrupting operation of the testing and graph-producing apparatus. Another object is to provide a device pivotally mounted upon the frame of an apparatus for recording pulmonary function characteristics upon a moving graph sheet, the device being adjustable for analyzing the graph formed upon such sheet.

Other objects will appear from the specification and drawings in which:

FIGURE 1 is a broken perspective view of a portion of a pulmonary function testing apparatus, such apparatus being equipped with the analyzing device of the present invention; FIGURE 2 is a top plan view of the gauge sheet portion of the analyzing device showing the scales thereon; FIGURE 3 is a broken longitudinal sectional view illustrating the automatic "erasing" mechanism for the graph sheet.

In the embodiment of the invention illustrated in the drawings, the numeral 10 generally designates a portion of a pulmonary function recording device in which a permanent record in the form of a graph 11 is inscribed upon a record sheet 12. In the illustration given, the record sheet is in the form of a belt carried by rollers 40 which in turn are rotatably mounted upon frame member 13. Roller or drum 14 is rotatably driven by a suitable motor 15 and is provided with sprocket teeth 16. The sprocket teeth engage the sheet 12 within a series of uniformly-spaced side openings 17, thereby providing a positive non-slip interconnection between the driving roll and the record sheet.

As is well known, graph 11 is formed by a stylus which rides back and forth over the slowly advancing record sheet to indicate a subject's breathing pattern thereon. The stylus arm moves in accordance with the breathing rate and volume of the subject. Since the stylus and the equipment connected therewith for urging it across the record sheet are entirely conventional a detailed description of these elements is believed unnecessary herein. Briefly, the apparatus for moving the stylus in accordance with a subject's breathing pattern may be of the water spirometer type or it may be a waterless apparatus of the type disclosed in my copending application Serial No. 90,405, filed February 20, 1961, now Patent No. 3,086,515.

Frame members 13 are provided with upstanding portions 18 on opposite sides of the record sheet 12. Support means in the form of a pair of support rods 19 bridge the upstanding portions of the frame and extend over the surface of the record sheet. It will be observed that the rods are spaced above the sheet and that they extend transversely with reference to the direction of movement of that sheet.

Slidably mounted upon the parallel bars 19 is a carriage 20 having an apertured body portion receiving the support rods. An extension 21 projects from the carriage body in the direction of movement of the record sheet 12 and is spaced above the record sheet in substantially parallel relation therewith. The free end of the extension is vertically apertured to receive a mounting element or bolt 22 for the mounting of gauge sheet 23.

The gauge sheet comprises a flat sheet of transparent plastic material having two adjacent edges 24 and 25 extending at substantially right angles to each other. The third side edge 26 is preferably arcuate. While side edges 24 and 25 are disposed at right angles, they do not meet at a right angle intersection; instead, the inner corner of the gauge sheet is provided with an apertured extension 27. The aperture 28 receives the mounting bolt 22 to permit pivotal movement of the gauge sheet along a horizontal plane spaced above the surface of record sheet 12. Extension 27 is sandwiched between the extension 21 of the carriage and a knurled nut 29. As shown in FIGURE 1, the head 30 of the nut is tapered to provide a downwardly projecting pointer beneath the overlapping extensions of the carriage and gauge sheet.

The gauge sheet is provided with a percentage scale 31 extending along one of its straight edges 24. The numerical indicia of the scale, and the reference lines associated therewith, may be imprinted and inscribed upon the sheet by any suitable means. As shown most clearly in FIGURE 2, the zero point of scale 31 is the pivot point for the gauge.

It will also be observed that the surface of the gauge sheet is imprinted or otherwise provided with a plurality of reference lines 32 radiating from a point of origin 33, such point of origin being spaced from the zero point of the percentage scale 31. Two scales 34 and 35 are associated with the radiating lines and are similarly imprinted or otherwise affixed to the sheet. Scale 34 includes numerical indicia representing rates of flow in liters per minute while scale 35 has numerals representing rates of flow in liters per second.

Referring to FIGURE 1, it will be seen that carriage 20 is provided with an arm 36 extending in the direction of movement of the carriage and having at its end a depending stop portion 37 engageable with the straight edge 24 of the gauge sheet to limit pivotal movement of that sheet. When the stop portion is engaged by the sheet, edge 25 extends longitudinally of the record sheet; that is, it extends in the direction of movement of the record sheet. Pivotal movement of the gauge sheet may be effected by using upstanding handle 38 affixed to the rigid sheet at one free corner thereof.

In the use of the apparatus in connection with pulmonary function tests, the amplitude of curve 11 represents the volume of air which a subject inspires and expires. If the curve represents the subject's normal breathing pattern then the amplitude will be the tidal volume. On the other hand, if the curve represents the maximum amounts which the subject can inhale and expire, the amplitude will represent his vital lung capacity. In any case, it may be desirable to compare the inspiration-expiration air volume for a subject with volumes calculated from standard reference tables and based upon the age, sex and size of the subject. Furthermore, where the apparatus is used to study a subject's breathing characteristics, it may be of considerable value to compare volume measurements taken at different times and to calculate one as a percentage of the other. All of this may be achieved by utilizing the percentage scale 31 along edge 24 of the rigid and transparent gauge sheet 23.

For example, if each of the uniformly-spaced reference lines 39 of the record sheet 12 represent volume increments of 1,000 cubic centimeters (cc.) then the amplitude of each curve 11 will represent an air volume of approximately 2,800 cc. If calculations or if prior testing reveal a lung volume measurement for the same subject of 5,000 cc., then the percentage of the calculated or prior volume may be readily determined by orienting the pointer 30 along the base line 39a of the record sheet and the "100 percent" mark along the 5,000 cc. line 39b and then reading the percentage along scale 31 in alignment with the highest point of curve 11. Such percentage determinations may be easily made during movement of record sheet 12. Furthermore, changes in the breathing characteristics of a subject, as reflected in amplitude changes on the graph, may be readily converted to percentages by reference to scale 31.

The rate of flow may be determined by reference to scale 34 (liters per minute) or scale 35 (liters per second). The gauge sheet 23 is pivoted against stop 37 so that edge 25 is parallel with the base line of the graph. Two points are selected on the inspiration portion of a curve 11 and reference point 33 of the transparent gauge sheet is superimposed upon the lower of these two points. A radiating line 32 is then selected which passes through the upper of the two points and numerical indicia associated with this line upon the gauge sheet will indicate the rate of air flow, either in liters per minute or in liters per second.

All positions of the gauge sheet necessary for determining volume percentages of rates of flow may be obtained by movement of the carriage along transverse bars 19 and by pivotal movement of the gauge sheet about the axis of mounting bolt 22. It will be understood of course, that similar determinations may be made with the gauge sheet detached from carriage 20 but, as pointed out above, the interconnection of parts greatly simplifies the operation of the gauge sheet and permits pulmonary function analysis while the tests are being conducted and record sheet 12 is in motion.

In the illustration given, record sheet or belt 12 is in fact a composite sheet formed of two superimposed layers or sheets 12a and 12b. The two sheets are formed from plastic material with outersheet 12a being translucent and undersheet 12b being opaque and of dark color. When a localized force is applied to outersheet 12a it tends to adhere to the smooth and preferably waxy surface of the undersheet so that the dark color of the undersheet shows through the outersheet in the area of impression. Thus, the combined sheets operate in much the same fashion as the "magic blackboards" for children wherein a marking may be "erased" by lifting an outer plastic sheet from a waxed board. Here, however, the impression is formed by a stylus of a respiration testing device and moving belt 12 is endless. Furthermore, stationary means is provided in the form of a transverse bar 40 affixed to frame members 13 and disposed between the two sheets 12a and 12b for separating the sheets and for automatically "erasing" the curve or graph 11 formed on the belt.

While in the foregoing I have disclosed an embodiment of the invention in considerable detail for purposes of illustration, it will be understood by those skilled in the art that many of these details may be varied without departing from the spirit and scope of the invention.

I claim:

1. In a pulmonary function testing apparatus, a record sheet supported for planar movement in one direction, means provided by said apparatus for advancing said sheet at a constant selected rate, a carriage, means supporting said carriage for movement along a plane parallel with said record sheet and transverse to the direction of movement thereof, and a gauge sheet pivotally carried by and movable with said carriage along a plane parallel with said record sheet and formed from a rigid transparent material, said gauge sheet being provided with a straight line air volume percentage scale.

2. In a pulmonary function testing apparatus, a record sheet supported for planar movement in one direction, means provided by said apparatus for advancing said sheet at a constant selected rate, a carriage, means supporting said carriage for movement along a plane parallel with said record sheet and transverse to the direction of movement thereof, and a gauge sheet pivotally carried by and movable with said carriage along a plane parallel with said record sheet and formed from a rigid transparent material, said gauge sheet being provided with a straight line air volume percentage scale, said gauge sheet being mounted for pivotal planar movement about a point coinciding with the zero point of said percentage scale.

3. In a pulmonary function testing apparatus, a gauge sheet formed from rigid transparent material and having at least one straight edge and a series of numerical indicia and reference lines spaced along said one edge to provide a straight line air volume percentage scale, a record sheet being adapted to bear a pulmonary function line graph and having spaced parallel reference lines thereon, means provided by said apparatus for advancing said record sheet at a constant selected rate beneath said gauge sheet and in the direction of said reference lines, and supporting means provided by said apparatus supporting said gauge sheet for planar movement over the surface of said record sheet and for pivotal movement about a point coinciding with the zero point of said percentage scale.

References Cited in the file of this patent

UNITED STATES PATENTS

| | | |
|---|---|---|
| 1,536,574 | Dumond | May 5, 1925 |
| 1,609,571 | Olson | Dec. 7, 1926 |
| 2,088,533 | Phelps | July 27, 1937 |
| 2,203,667 | Buechmann | June 11, 1940 |
| 2,304,965 | Sproule | Dec. 15, 1942 |
| 3,011,854 | Allen | Dec. 5, 1961 |
| 3,021,814 | Hyatt | Feb. 20, 1962 |